(12) United States Patent
Albright et al.

(10) Patent No.: US 7,296,862 B2
(45) Date of Patent: Nov. 20, 2007

(54) COLLAPSIBLE TRACK UNDERCARRIAGE FOR INSTALLATION AND TENSIONING

(75) Inventors: Larry E. Albright, Gwinner, ND (US);
Dan Frederick, Forman, ND (US);
Rodney Koch, Mooreton, ND (US);
Andrew A. Wehseler, Gwinner, ND (US)

(73) Assignee: Clark Equipment Company, Montvale, NJ (US)

( * ) Notice: Subject to any disclaimer, the term of this patent is extended or adjusted under 35 U.S.C. 154(b) by 166 days.

(21) Appl. No.: 11/120,356

(22) Filed: May 3, 2005

(65) Prior Publication Data
US 2005/0252592 A1    Nov. 17, 2005

Related U.S. Application Data

(60) Provisional application No. 60/570,333, filed on May 12, 2004.

(51) Int. Cl.
*B62D 55/30*    (2006.01)
(52) U.S. Cl. ...................... 305/145; 305/143; 305/155
(58) Field of Classification Search ................ 305/134, 305/135, 143, 145, 150, 155, 125, 141; 180/9.5, 180/9.52, 9.62, 9.64
See application file for complete search history.

(56) References Cited

U.S. PATENT DOCUMENTS

| | | | | |
|---|---|---|---|---|
| 2,827,337 A | | 3/1958 | Buffum ........................ | 305/10 |
| 2,843,431 A | | 7/1958 | Beaufort ......................... | 305/9 |
| 3,549,213 A | | 12/1970 | Smith et al. ................... | 305/10 |
| 3,664,449 A | * | 5/1972 | Vardell ....................... | 180/9.48 |
| 4,227,748 A | * | 10/1980 | Meisel, Jr. ................... | 305/144 |
| 4,840,437 A | * | 6/1989 | Henry et al. ................. | 305/144 |
| 5,273,126 A | * | 12/1993 | Reed et al. ................. | 180/9.21 |

(Continued)

FOREIGN PATENT DOCUMENTS

DE    23 58 386    11/1973

(Continued)

OTHER PUBLICATIONS

European International Search Report.

(Continued)

*Primary Examiner*—Russell D. Stormer
*Assistant Examiner*—Kip Kotter
(74) *Attorney, Agent, or Firm*—Michael Best & Friedrich LLP

(57) ABSTRACT

A track frame or undercarriage is made to support a rubber track on suitable guide rollers. A tensioning roller is provided as one of the guide rollers on the interior of the track and is mounted on a pivoting bracket. The pivoting bracket moves the tensioning roller to a working position for creating tension in the track. An actuator provides a known force on the pivoting bracket to move the tensioning roller to its working position, using a controlled pressure applied to the actuator. Drive sprockets for the track are mounted onto a drive case that is mounted to the frame through pivoting linkages such that the drive case and the drive sprocket can be held in a working position and retracted away from the track. The position of the tensioning roller is maintained within set limits of retractions during use, by providing a stop to limit the amount that the tensioning roller can retract.

12 Claims, 6 Drawing Sheets

U.S. PATENT DOCUMENTS

| | | | |
|---|---|---|---|
| 5,927,412 A | 7/1999 | Crabb | 180/9.44 |
| 6,062,327 A | 5/2000 | Ketting et al. | 180/9.52 |
| 6,408,965 B1 | 6/2002 | Grant | 180/9.62 |
| 6,869,153 B2 * | 3/2005 | Wright et al. | 305/169 |
| 2004/0045747 A1 | 3/2004 | Albright et al. | 180/9.1 |

FOREIGN PATENT DOCUMENTS

| | | |
|---|---|---|
| DE | 25 38 488 | 8/1975 |
| EP | 0 332 869 | 9/1989 |
| JP | 52140131 A  * | 11/1977 |
| JP | 04019285 A | 1/1992 |
| JP | 09099873 A | 10/1995 |
| JP | 10218046 A2 | 8/1998 |
| SU | 1066876 A | 6/1980 |

OTHER PUBLICATIONS

Written Opinion.

* cited by examiner

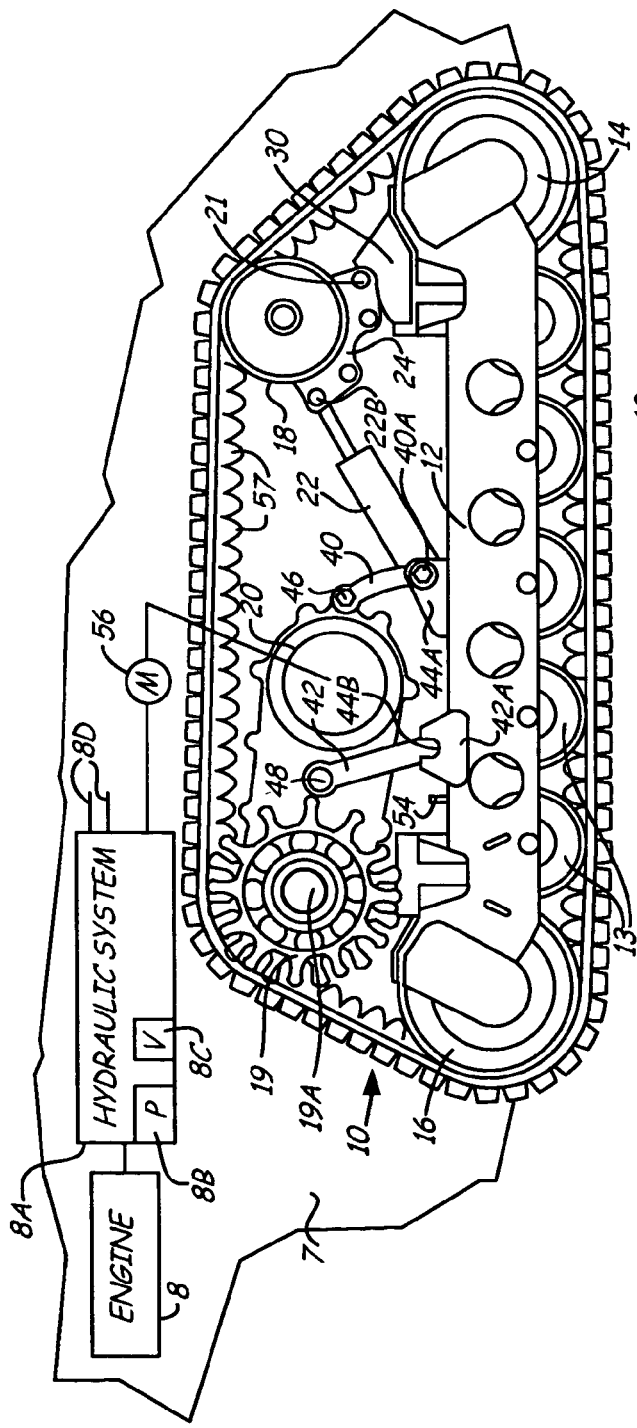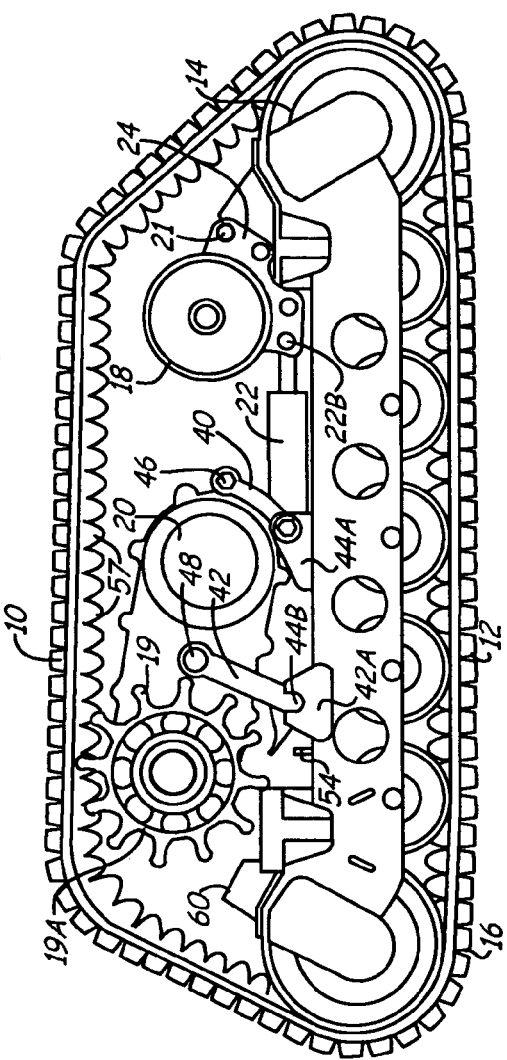

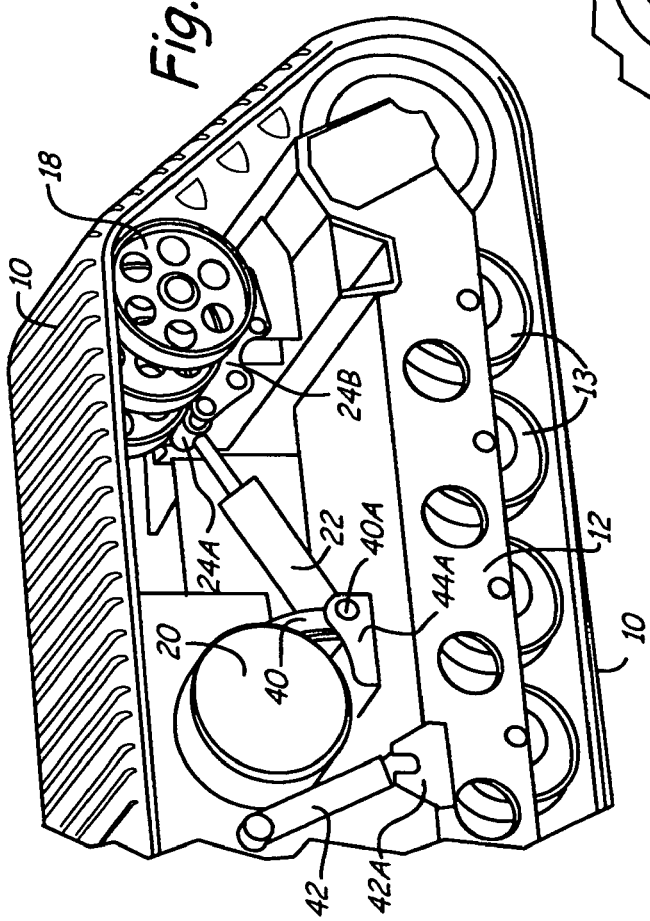
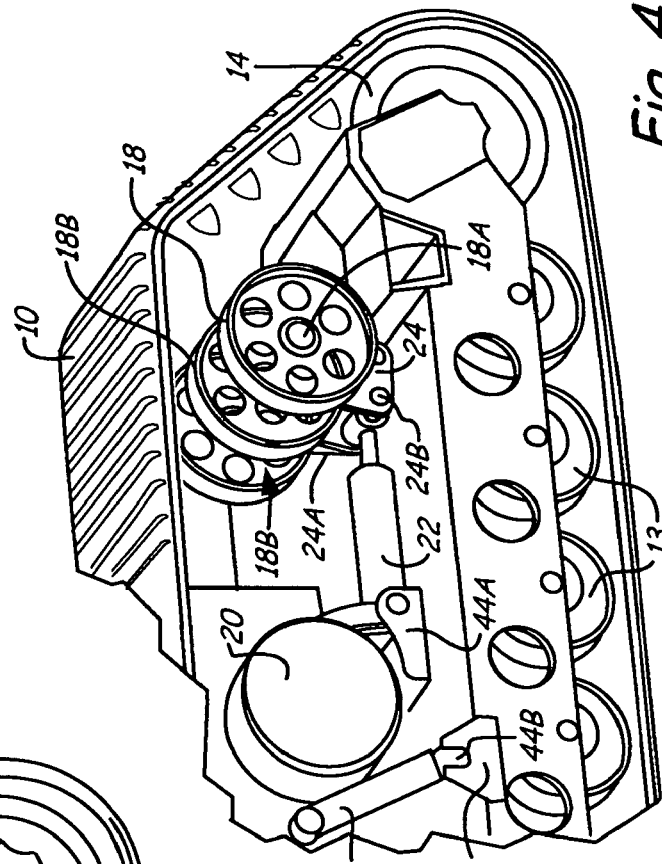

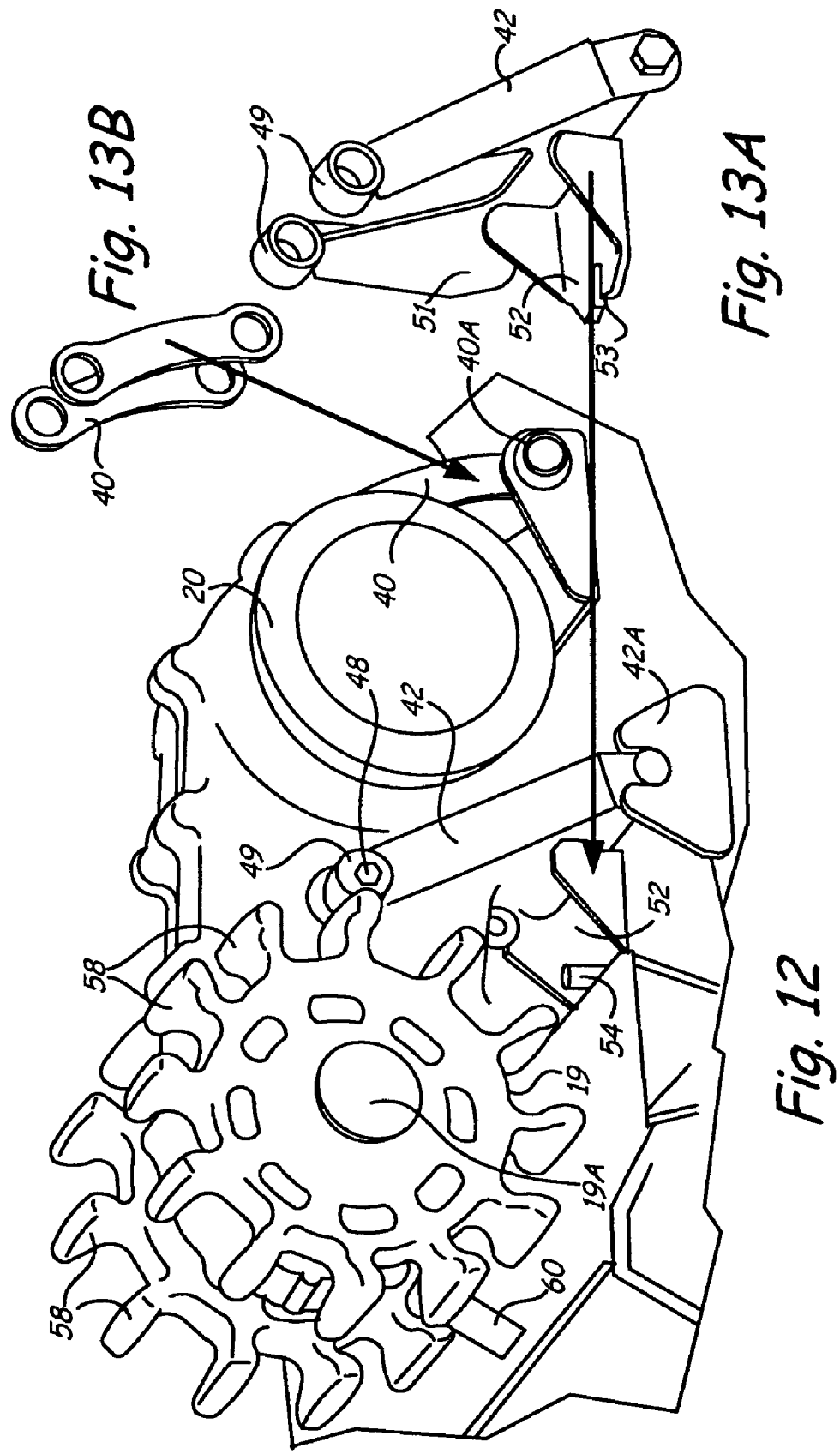

COLLAPSIBLE TRACK UNDERCARRIAGE FOR INSTALLATION AND TENSIONING

This application is based upon and claims priority from U.S. Provisional Application Ser. No. 60/570,333, filed May 12, 2004, the content of which is incorporated by reference.

BACKGROUND OF THE INVENTION

The present invention relates to a mounting system for an endless drive track used in a crawler type vehicle, such as a loader, tractor or the like. The mounting system comprises an undercarriage that includes pivotally moveable track rollers that support the track under tension in one position and loosen the track in another position so that the track can be taken off the support rollers and re-installed, and then, when desired, the rollers are pivoted back to a position to maintain a desired tension in the track.

In the prior art, the use of track drives for various vehicles including tractors and self propelled loaders has been expanding. Track laying vehicles have been well known for years, and generally do include guide rollers or sprockets that will guide the track in a path of movement as it is driven. Tension in the track is provided by various adjustment devices including springs, threaded adjusters, pressure actuators and the like.

Rubber or elastomeric tracks require tension to prevent the track from derailing from the drive sprockets, guide rollers, and idlers or bogie wheels. Typical track tensioning mechanisms use screws or grease filled cylinders acting against heavy springs to move the front or rear idler rollers longitudinally to provide the track tension. The longitudinal movement is nearly parallel to the fore and aft direction of vehicle movement. A moveable idler is generally mounted in a telescoping support structure, and the springs maintain the tension when the track stretches. The springs also compress a limited amount when objects get between the track and the support wheels or undercarriage, or when there is some other large, sudden load on the track. Due to the large wrap angle of the track that spans over the adjustable front or rear idlers in prior art systems, large tensioning forces are required. The magnitude of prior tension forces approaches twice the desired track tension force. Hydraulic cylinders have been used to tension tracks but the needed high tensioning forces require large cylinder bores or high hydraulic pressure, and when space is restricted, as in the support frames for a track undercarriage, this becomes a problem.

SUMMARY OF THE INVENTION

The present invention relates to a track tensioning system that includes moveable components or members that mount track tensioning sprockets or to provide tension in a track with a low wrap angle on the roller to reduce the needed loading force. The tensioning sprockets or rollers can be moved with hydraulic actuators or other actuators between a track tensioning position and a collapsed position. The tensioning sprockets or rollers can be moved sufficiently when in the collapsed position so that the track is slack enough to be taken off the drive sprockets and guide rollers for service, and then replaced. After replacement, the actuators are operated to move the track tensioning sprockets or rollers into position where they will maintain a tension on the track. The moveable roller mountings are supported so the loading forces are reduced while still obtaining adequate track tension.

Two forms of moveable supports for providing a track tension control are illustrated. A chain case or power drive case is utilized for driving sprockets that in turn drive lugs in the track, and the chain case is mounted on a four bar linkage that will permit movement of the gear box and the drive sprockets between a track tensioning and usable position, and a retracted position. The chain case can be locked in place with suitable latches, for use, and then released and retracted for creating slack in the track.

In addition, an idler roller for the interior of the track is mounted on a pivoting bracket that is controlled with a hydraulic actuator that can be maintained under a set uniform pressure during use to insure that the track tension will be maintained even under extraordinary conditions, but also insures that the track will not be overstressed.

The tracks used in this invention generally are rubber tracks, as opposed to steel tracks. However, the concept of the invention will work on either type of track.

The present invention uses a roller wheel assembly located between the undercarriage frame and the upper track portion, with tensioning wheels that are mounted on pivoting brackets or linkages and which rotate or pivot to tension the track at locations selected so the wrap angle of the track around the sprocket or roller is reduced. Tensioning forces are thus also reduced.

The idler roller wheel support has one end pivoted on the track frame and a hydraulic cylinder is connected to the pivoting support. A low-pressure charge oil system is used for providing pressure to the cylinder. The charge oil system is used for other purposes on the vehicle and provides a lower limit for track tension forces. When the vehicle, such as a loader is started, the track tension-loading cylinder is extended and tensions the track until charge system pressure is reached. The forward driving forces on the track will cause the track to stretch and further cylinder extension follows the additional track length with a tension load. Further cylinder extension is automatically provided with the use of the hydraulic cylinder loading systems of the present invention. When the track relaxes or the track is driven backwards, track tension forces cause the cylinder to retract, under a maintained uniform pressure. The displaced oil will open a relief valve, so that the relief valve setting provides a pressure that is an upper limit for track tension force.

The relief valve pressure allows an almost stable, maximum track tension than the tension provided by the hydraulic system charge pressure. Objects that are trapped between the track and support rollers also will cause the tension cylinder to retract with the maximum track tension controlled by the relief valve setting.

The hydraulic system has a manual override valve to allow collapsing the cylinders loading the tension rollers collapsing and moving the track support sprockets or rollers for track replacement.

BRIEF DESCRIPTION OF THE DRAWINGS

FIG. 1 is a side elevational view of a typical undercarriage shown with a track driven or crawler vehicle fragmentarily illustrated, with the track under a tension;

FIG. 2 is a side view similar to FIG. 1 of the track support frame and undercarriage with a retractable track tensioning roller in a retracted or collapsed position;

FIG. 3 is a perspective view of a track idler tension roller being maintained in a working, track tension creating position with a hydraulic cylinder or actuator under regulated pressure;

FIG. 4 is a perspective view similar to FIG. 3 with the track tension roller in a retracted, track slack-creating position;

FIG. 12 is a perspective view of a support linkage for the track drive chain case in a working track tension creating position;

FIG. 13A is a view of a forward support linkage for the drive chain case shown in FIG. 12; and FIG. 13B is a perspective view of a rear support linkage used with the drive chain case shown in FIG. 12.

DETAILED DESCRIPTION OF THE PREFERRED EMBODIMENTS

Figure 5:
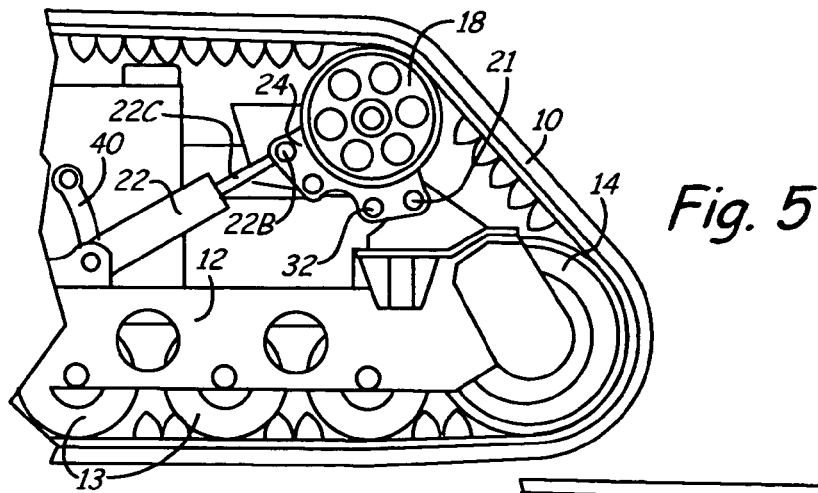
FIG. 5 is a side view of the track tension roller shown in FIG. 3 in its track tensioned creating position.
Figure 6:
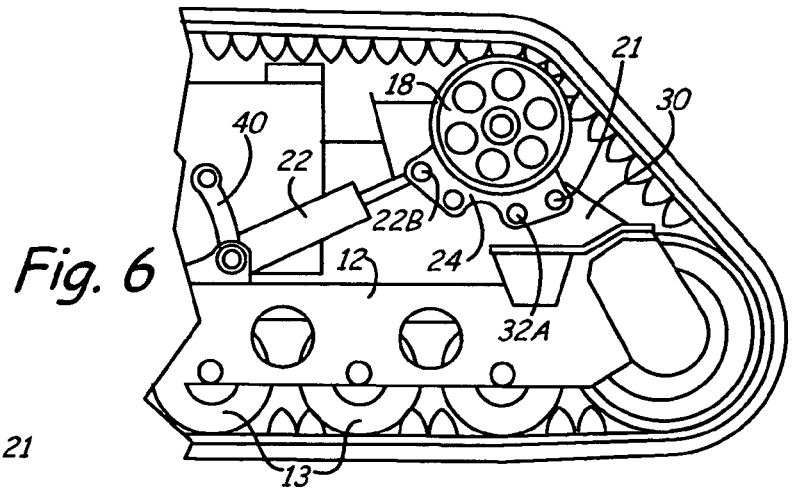
FIG. 6 is a view similar to FIG. 5, with the track tension roller in a stopped position that limits the amount of possible track slack during normal operation.

In FIG. 1, a compact loader shown at 7 is illustrated only schematically, and is of a conventional design. The loader is powered with an engine 8, to provide power to a hydraulic system 8A including a pump 8B, suitable valves 8C, and various hydraulic controls that would be connected along lines 8D. The valves 8C control motors 56 that are used for driving the input shafts of suitable drive chain cases or gear drives for driving tracks 10, as shown, a rubber track on each side of the frame 7.

FIG. 1 is shown with the track on one side of the loader in a working or operating position. The track frame or undercarriage 12 is attached in a suitable manner to the loader body or frame 7. The track frame 12 supports bogie wheels 13, that are mounted on the frame 12 for supporting the lower length of the track 10. The track frame 12 also supports a rotatable, but fixed position, front idler roller 14, and a rear idler roller 16. The front upper portion of the track 10 is held in working position with a retractable, tensioning multi-wheel roller 18, that, as will be explained, is mounted on a pivoting bracket so the tensioning roller 18 is collapsible or pivotable to release tension in the track.

A chain case 20, (or power drive box) is driven by a hydraulic motor 56, and includes an output shaft 19A that drives a set of rubber track drive sprockets 19. The output shaft 19A is driven from internal drives in the chain case 20 by the motor 56.

Also, as will be explained, the chain case 20, and thus the drive sprockets 19, can be retracted from the working position shown in FIG. 1. Pivoting support linkages 40 and 42 are used to mount the chain case 20.

The position of track tensioning roller 18 is controlled in a suitable manner so that the tensioning roller can be retracted or collapsed to the position shown in FIG. 2, and the chain case 20 also can be retracted to the position shown in FIG. 2 for providing slack in the track 10.

The track 10 in FIG. 2 is shown in its original drive position, but with the roller 18, and the chain case 20 retracted from their working positions. The bracket 24, which supports the tensioning roller 18 is mounted on a pivot pin 21 to a support bracket 30 that is fixed relative to the track frame 12. It can be seen in FIGS. 3 and 4 that the bracket 24 has a pair of side plates 24A and 24B that provide stability, and the pivot pin 21 extends across the bracket 30 and supports both the side plates 24A and 24B. In FIG. 4 it can be seen that the roller 18 comprises three side by side and spaced apart wheels 18B mounted on a common shaft 18A that is mounted for rotation on the bracket 24.

The pivotal position of the bracket 24 about the pivot pin 21, and thus the position of the tension roller 18, is controlled by a hydraulic cylinder 22. The base end of hydraulic cylinder 22 is mounted with a pin onto a suitable bracket 44A. The cylinder 22 has an extendable and retractable rod, the end of which is mounted with a pin 22B to the bracket 24. This can be seen in FIGS. 3, 4, 10 and 11.

There are track frames 12 and tracks 10 on both sides of the vehicle 7, so that there will be two of the cylinders 22 used on a vehicle. Only one side is shown, in that the track frame on the other side is a mirror image of the one shown.

When the cylinder or actuator 22 is extended under hydraulic pressure as shown in FIGS. 1 and 3, as well as other detailed figures, the bracket 24 is pivoted to a position wherein the roller 18 engages the inner surface of the track along smooth surfaces, to tension the track 10. It can be seen that the tension force is from movement of the roller 18 in an arcuate path about the pivot pin 21. The amount of wrap of the track 10 around the tension creating roller 18 is kept low, that is less than 90°. The force provided by the cylinder 22 does not have to be as great as that force needed when tension is provided by a horizontally acting spring, grease cylinder or a hydraulic actuator of conventional track tensioning devices that have almost 180° of wrap on the tensioning roller.

The cylinder 22 can be retracted, utilizing suitable valves from the hydraulic system along lines 8D. Preferably the cylinder 22 will be controlled with a hydraulic circuit arrangement illustrated in FIG. 9. In the retracted position of the cylinder rod, such as shown in FIG. 2, tension creating roller 18 is moved away from the track path so that the track 10 is very slack and can be easily removed and replaced.

When the track 10 is to be again in place and is to be tensioned, the actuator or cylinder 22 is extended, to return the pivoting bracket 24 to a typical working position shown in FIG. 1.

The rod of cylinder 22 has adequate movement to move the tension roller 18 between the positions shown in FIGS. 3 and 4, which are perspective views of the track.

Thus, by selecting the position of the tension roller 18, the track tension can be controlled and maintained, as well as being releasable for track replacement.

A stop limit on the amount of track slack permitted during use is provided. The stop insures that tension roller 18 will not retract excessively if an object gets in between a track roller and the track, or if sudden high loads occur for some other reason.

Figure 7:
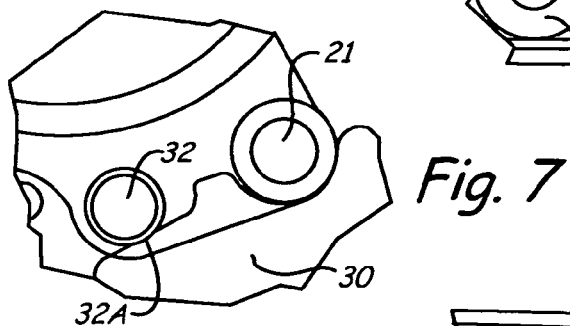
FIG. 7 is a detailed enlarged view of the track tension roller mounting bracket shown in FIG. 6 in a stopped position.
Figure 8:
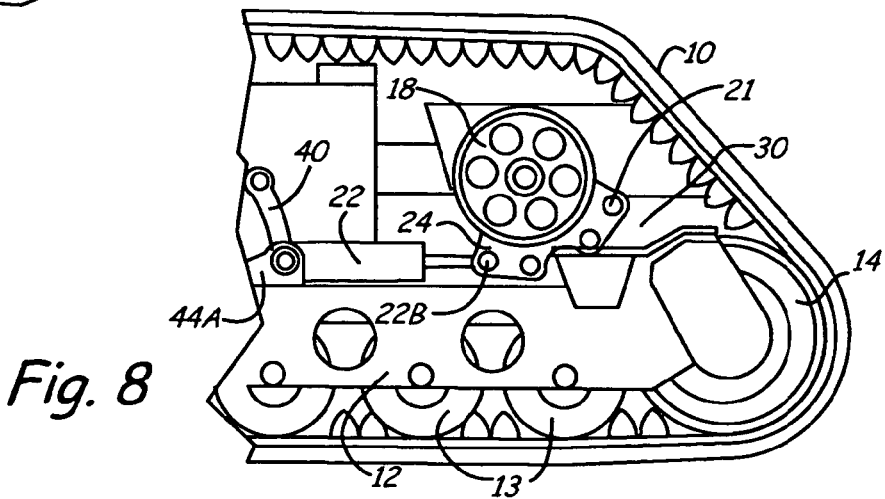
FIG. 8 is a view similar to FIG. 5 with the track tension roller in a fully retracted position.

As can be seen in FIGS. 5, 6, 7 & 8, the pivoting of the bracket 24 can be limited by use of a stop pin 32. The stop pin 32 is mounted on and moves with the bracket 24, as shown in FIG. 7. The pin 32 spans across the support bracket 30 for the bracket 24. Bracket 30 is shown in perspective view in FIGS. 6 and 7, and it can be seen that the pin 32 will engage an edge on the bracket 30 at the point 32A shown in FIGS. 5 and 7 to provide the stopped position. When the track is to be removed, stop pin 32 is removed and the bracket 24 can be pivoted to its fully retracted position as shown in FIG. 2. The pin 32 is left in place on bracket 24 during use so that the track will not become excessively slack during use.

Figure 9:
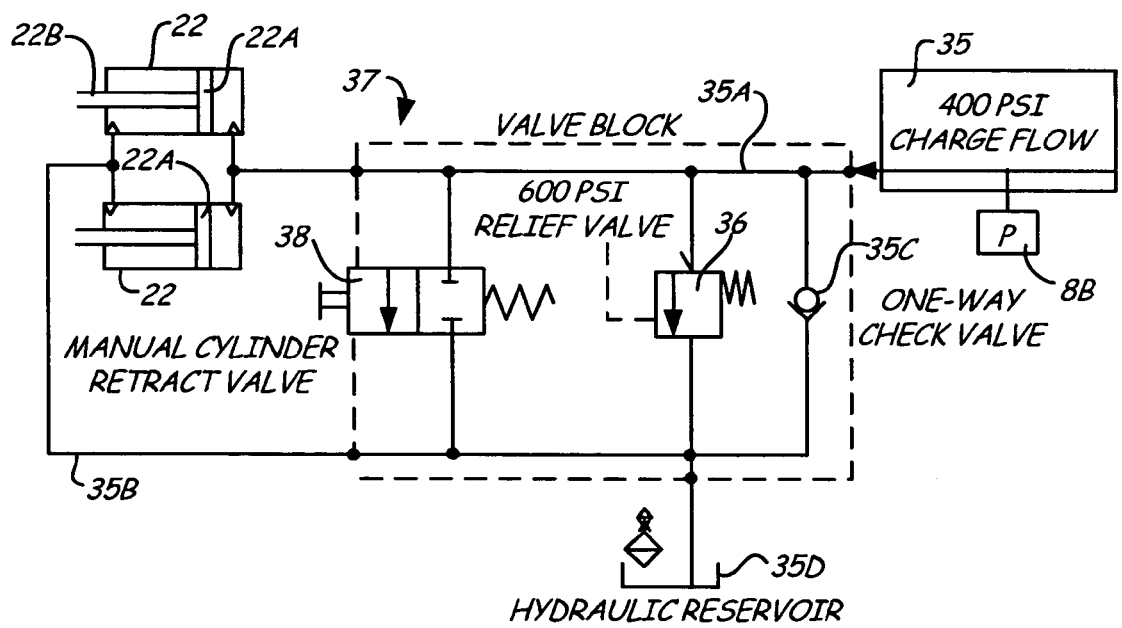
FIG. 9 is a schematic representation of a typical hydraulic system for maintaining pressure in the cylinder or actuators for loading the track tension rollers.

FIG. 9 is a schematic drawing of a hydraulic circuit 37. The pump 8B provides flow to a hydraulic charge flow system 35, which typically provides about a 400 psi supply flow to the hydraulic circuit 37 that provides pressure to the base ends of actuators 22. FIG. 9 shows the two actuators 22, one for each of the track frames 12 on the opposite sides of the loader. The cylinders 22 are connected in parallel so that pistons 22A of both cylinders will be subjected to the same pressure for either extending or retracting the cylinder rods 22C.

The pressure input line 35A is provided to the base of the cylinders or actuators 22, to act on the pistons 22A and extend the rods 22B under pressure from the 400-psi source. A return line 35B is connected from the rod ends back to a hydraulic reservoir 35D. A 600 psi relief valve 36 is connected across the lines 35A and 35B, as shown. A manual cylinder retract valve 38 is also connected across these lines.

The relief valve 36 is set so that the cylinders 22 will be provided with a maximum limiting pressure to limit the force that can be reacted by the rods of cylinders 22, and thus limit the track tension. If the track tension exceeds a certain set level because of loads on the tension roller 18, the pressure on the base end of the cylinders raises and the relief valve 36 opens. The track tension is at a maximum at this set pressure level. If the pressure on the base ends of the cylinders drops, the relief valve will close.

The manual valve 38 permits manually retracting the cylinders 22. The valve 38 can be moved to bleed the pressure from the line 35A to the reservoir 35D so the cylinders retract.

In addition to the movable tension roller 18, as previously mentioned, the chain case or power drive case 20 can be retracted away from the inner surface of the track 10.

Figure 10:
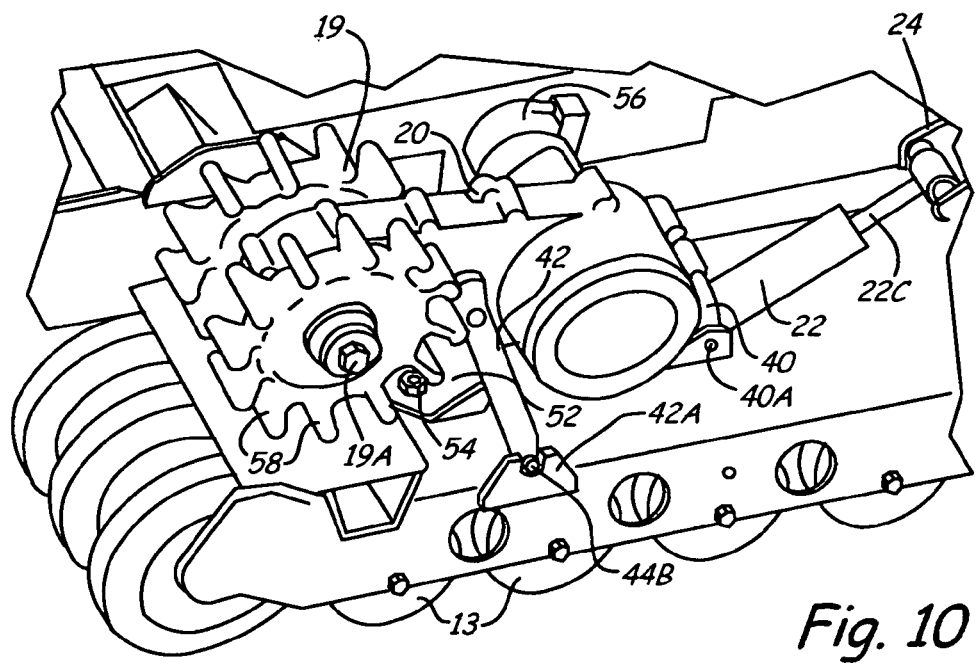
FIG. 10 is a perspective view of a track drive chain case that is shown in FIG. 1, with the track removed for illustrative purposes.
Figure 11:
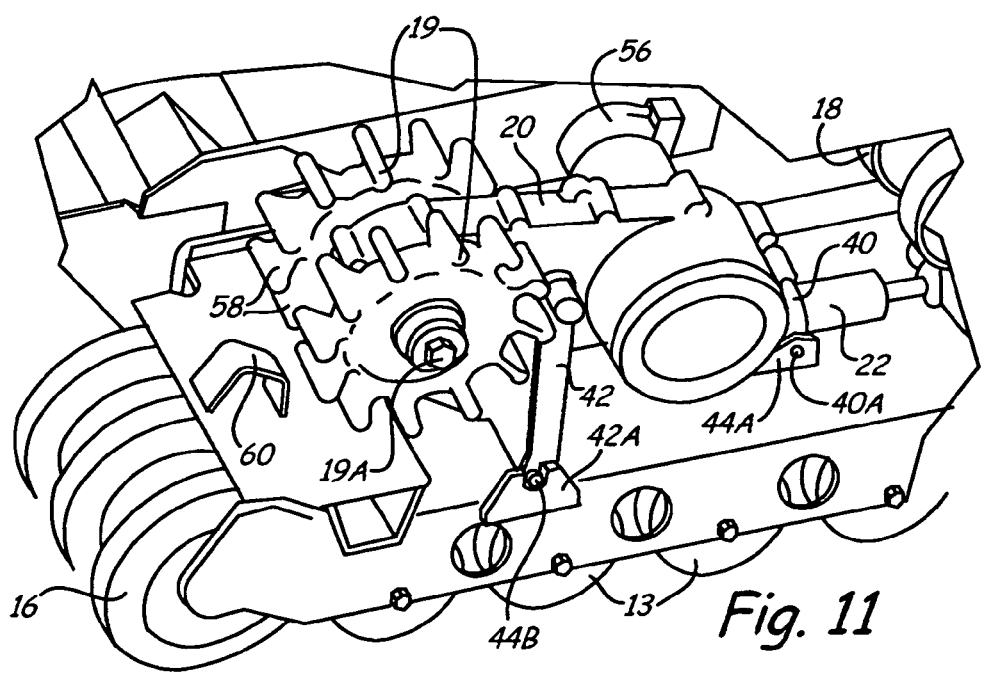
FIG. 11 is a view similar to FIG. 10, with track drive sprockets retracted and illustrating support and stop members.

The chain case or power drive case 20 is shown in FIGS. 10-12 with the track removed. The track drive sprocket 19 is shown in FIGS. 10-12, and the mounting links 40 and 42 are separately illustrated in FIGS. 13A and 13B.

Mounting links 40 and 42 are pivotally mounted at first ends to the track frame 12, using suitable pivot pins 40A and 44B, respectively, that are attached to suitable brackets 44A and 42A supported on the track frame 12. The bracket 42A can be used for mounting cylinder 22 as well. The second end of link 40 is pivotally mounted to the chain case 20 with pivot pins 46 on opposite sides of the chain case. The second end of mounting link 42 is pivotally mounted to the chain case 20 with pivot pins 48 on opposite sides of the chain case. The mounting links 40 and 42 each have two arms, as shown in FIGS. 13A and 13B. The mounting link 42 has suitable hubs 49 that pivot on the pins 48 on the chain case 20.

The links 40 and 42 pivot to guide and support the chain case. The chain case 20 is moved manually when it is desired to collapse or move the drive sprockets 19 away from their working position shown in FIG. 1. It can be seen that there are sprockets 19 on each side of the chain case 20. The sprockets 19 are driven by the hydraulic motor 56, that connects into the hydraulic system 8A.

An internal chain in the chain case 20 drives internal sprockets to rotate the output shaft 19A and drive the sprockets 19. The drive lugs 58 on the sprockets engage lugs 57 that are formed on the interior of the track 10 (FIGS. 1 and 2).

The link 42 has a cross member 51, that holds a mounting bracket 52, as shown in FIG. 13A, specifically, and also in FIGS. 1, 2, 10 and 12. Bracket 52 is fixed to move with the link 42, and has a slot 53 in the center, as can be seen in FIG. 13A. A bolt 54 is threaded into or otherwise fixed to the track frame 12, and it aligns with the slot 53. When the chain case 20 is in the working or track drive position, the bolt 54 extends through the slot 53, as can be seen in FIGS. 10, 12, as well as FIGS. 1 and 2. The chain case 20 and the sprockets 19 are held in working position with the bracket 52 as shown in FIGS. 1, 10 and 12. The center portion of the bracket 52 is clamped against the top of the track frame 12, and held with a suitable nut and washer on the bolt 54, or in some other manner retained in its position shown in FIGS. 1, 10 and 12.

When the chain case 20 is to be retracted, the nut on the bolt 54 is removed, and the chain case 20 can be moved to its position shown in FIG. 2, as guided by the links 40 and 42.

A stop bracket 60 (see FIG. 11) is provided on the frame 12, and aligns to support the chain case or power drive case 20 in its working position, when the nut on the bolt 54 is tightened down. The nut on bolt 54 can be tightened securely so that it will not shake loose. In the working position of the chain case the sprockets 19 and the lugs 58 are held against the track to support the track and provide a track drive.

It can be seen that the links 40 and 42 support opposite sides of the chain case, on suitable pivot pins, to provide stability for the chain case 20 and adequate support and tension in the track.

The movement of tension roller 18 in an arc provides a force that is vectored at an angle relative to the fore and aft axis of the vehicle. The stop pin 32 limits the movement of the tensioning rollers 18 to insure that the track will not be forced to become slack enough to come off the track rollers during use, if something should get between the track rollers and the track. When the stop pin 32 is removed, the tension roller 18 can be retracted so that the track 10 is slack (FIG. 8), and the chain case 20 or other support for the drive sprockets 19 also can be retracted for increasing the amount of track slack available. The actuators or cylinders 22 are arranged with a hydraulic system to maintain a desired tension in the track because of a controlled pressure source. A maximum pressure is set by a relief valve that will ensure that the rubber track 10 will not be excessively tensioned.

Although the present invention has been described with reference to preferred embodiments, workers skilled in the art will recognize that changes may be made in form and detail without departing from the spirit and scope of the invention.

What is claimed is:

1. A drive track support for a vehicle comprising a support frame extending in fore and aft direction, a plurality of guide rollers on the support frame for guiding an endless track, said guide rollers including a moveable tension roller positioned to move at an acute angle relative to the fore and aft direction to create a tension in an endless track on the guide rollers along a vector at an acute angle relative to the fore and aft direction;

wherein there is a track drive wheel for driving the endless track at an end of the track frame opposite from the tension roller, a drive case having an output shaft mounting and driving the track drive wheel, and a linkage for moveably supporting the drive case relative to the track frame to permit the drive case and track drive wheel to move to a retracted position reducing tension on the endless track.

2. The drive track support of claim 1, wherein said tension roller is mounted on a bracket, a pivot for connecting the bracket to the track frame, and a control actuator for moving the bracket about the pivot to provide the tension with a force acting along the vector.

3. The drive track support of claim 2, wherein said control actuator comprises a hydraulic actuator, and a hydraulic circuit providing a known, substantially uniform pressure to the actuator to maintain a known tension in the endless track.

4. The drive track support of claim 3, wherein said hydraulic circuit has a pressure relief valve to control maximum pressure exerted on the actuator.

5. The drive track support of claim 2 and a stop member to limit the amount the bracket can move about its pivot in a direction for releasing tension in the endless track.

6. The drive track support of claim 1, wherein said drive case is supported in a releasable fixed position for driving the endless track with the track drive wheel, and a bracket for releasably holding the drive case in its fixed position, and being releasable to permit the drive case to move to its retracted position.

7. The drive track support of claim 1, wherein said linkage supporting said drive case comprises a pair of pivoting linkages, said pivoting linkages each having first ends pivotally mounted to the support frame, and second ends pivotally mounted to the drive case.

8. A drive track support for a vehicle comprising:
a support frame for supporting and mounting an endless track frame for the vehicle;
a track drive wheel for driving an endless track;
a drive case having an output shaft mounting and driving the track drive wheel; and
a linkage for moveably supporting the drive case relative to the endless track frame to permit the drive case and the track drive wheel to move to a retracted position reducing tension on the endless track;
wherein the linkage supporting the drive case comprises a pair of pivoting linkages, the pivoting linkages each having first ends pivotally mounted to the support frame, and second ends pivotally mounted to the drive case.

9. The drive track support of claim 8, wherein the drive case is supported in a releasable fixed position for driving the endless track with the track drive wheel, and further comprising a bracket for releasably holding the drive case in its fixed position, and being releasable to permit the drive case to move to its retracted position.

10. A support frame for supporting and mounting an endless track frame for a vehicle, the support frame extending in fore and aft direction, guides on the support frame for guiding an endless track, including a guide roller, a drive on the endless track frame to drive the endless track in a path around the endless track frame, an arm pivoted to the support frame at one end and having the guide roller mounted at an opposite end, the arm being movable from a working position to a retracted position, an actuator to move the arm between its retracted position and working position, the guide roller engaging the track to create a tension in the track with the arm in its working position;
wherein said actuator comprises a hydraulic actuator, and a hydraulic circuit providing a known, substantially uniform pressure to the hydraulic actuator to maintain a known tension in the track; and
a removable stop member to limit the amount the arm can pivot about its pivot from its working position toward its retracted position, said stop being removable to permit the arm to move to its retracted position;
wherein there is a track drive wheel for driving the track on the support frame at a position spaced from the guide roller, a drive case having an output shaft, a track drive wheel drivably mounted on the output shaft, and a linkage for moveably supporting the drive case relative to the support frame to permit the drive case and track drive wheel to move to a retracted position reducing tension on the track.

11. The support frame of claim 10, wherein said drive case is supported in a releasable fixed position for driving the endless track with the track drive wheel, and a bracket for releasably holding the drive case in its fixed position, and being releasable to permit the drive case to move to its retracted position.

12. The support frame of claim 10, wherein the arm is pivotally mounted on a support bracket, the removable stop comprising a removable pin carried on the arm, the pin engaging a portion of the support bracket as the arm moves from its working position toward its retracted position.

* * * * *